United States Patent
Choi et al.

(10) Patent No.: US 8,828,770 B2
(45) Date of Patent: Sep. 9, 2014

(54) APPARATUS AND METHOD FOR CORRECTING POSITION OF LASER BEAM FOR USE IN MANUFACTURING BIOSENSOR WITH FINE PATTERN

(75) Inventors: Ji-woong Choi, Daejeon (KR);
Jong-hun Seung, Daejeon (KR)

(73) Assignee: Jeong Won Technology (KR)

( * ) Notice: Subject to any disclaimer, the term of this patent is extended or adjusted under 35 U.S.C. 154(b) by 411 days.

(21) Appl. No.: 13/401,364

(22) Filed: Feb. 21, 2012

(65) Prior Publication Data
US 2013/0200049 A1    Aug. 8, 2013

(30) Foreign Application Priority Data
Feb. 8, 2012   (KR) .................. 10-2012-0012901

(51) Int. Cl.
*H01L 21/00* (2006.01)
*B23K 26/38* (2014.01)

(52) U.S. Cl.
USPC ......... 438/49; 204/403.01; 29/846; 427/98.4; 427/256; 118/620; 219/121.68; 219/121.69

(58) Field of Classification Search
CPC ...... H05K 3/027; H05K 3/0026; H01L 21/00; B23K 26/38
USPC .......... 438/49; 204/403.01; 29/846; 118/620; 427/98.4, 256; 219/121.62, 121.68, 219/121.69, 121.78, 121.83
See application file for complete search history.

(56) References Cited

U.S. PATENT DOCUMENTS

| | | | | |
|---|---|---|---|---|
| 6,004,441 | A * | 12/1999 | Fujiwara et al. | 204/403.14 |
| 6,870,603 | B2 * | 3/2005 | Teeuwen | 355/68 |
| 7,476,827 | B1 * | 1/2009 | Bhullar et al. | 219/121.69 |
| 7,501,301 | B2 * | 3/2009 | Kovacs et al. | 438/49 |

\* cited by examiner

*Primary Examiner* — Samuel M Heinrich
(74) *Attorney, Agent, or Firm* — Cantor Colburn LLP

(57) ABSTRACT

An embodiment includes a loading unit with an alignment mark configured to support a substrate, a laser beam generating unit configured to generate a laser beam toward the upper surface of the loading unit, a vision unit that causes the laser beam generating unit to irradiate the laser beam onto the substrate on the loading unit to form an alignment mark on the substrate and that generates corrected coordinate values based on the formed alignment mark on the substrate, a position detector located at the center of the loading unit to detect information about the laser beam generated by the laser beam generating unit, and a controller that controls an X-Y scanning mirror according to the corrected coordinate values, and controls power of the laser beam generated by the laser beam generating unit or the position of the loading unit according to the information detected by the position detector.

11 Claims, 9 Drawing Sheets

APPARATUS AND METHOD FOR CORRECTING POSITION OF LASER BEAM FOR USE IN MANUFACTURING BIOSENSOR WITH FINE PATTERN

BACKGROUND OF THE INVENTION

1. Field of the Invention

The present invention relates to an apparatus and method for correcting the position of a laser beam used in the manufacture of a biosensor having a fine pattern, and more particularly to an apparatus and method for correcting the position of a laser beam used in the manufacturing of a biosensor having a fine pattern, especially for use in patterning integrated circuits for biosensors by irradiating a laser beam onto a thin film coated on a pet film.

2. Description of the Related Art

A biosensor is a sensor which uses a biologically sensitive material composed of biological elements. Recently, biosensors have demonstrated a high potential for application to various industrial fields including the medical field. Especially, it has been highly anticipated to be a technology allowing for the quick detection of germs that cause food poisoning in the fields of food safety, agricultural raw materials, and live animals. Biosensors are categorized into various types such as an optical type, an electrochemical type, a piezoelectric type, an impedance type, or the like depending on a signal obtained from the sensitive material and a signal conversion method.

Among these biosensors, the impedance type of biosensor has a detector on an electrode for detecting a bio-molecule, so that it has been used in various fields as a tool to detect a change in both the capacitance and resistance of a specific biometric material.

In order to improve the precision of the biosensor, a circuit pattern may be formed on a thin gold film.

In the related arts, when forming a circuit pattern on a thin film, the circuit pattern is formed on the thin film by repeatedly performing a complicated process including exposing, etching, and the like using a photoresist.

The thin gold film is formed using a method such as thermal evaporation.

Then, the thin gold film is wet-etched or dry-etched using a photoresist pattern as a mask so that a gold pattern, i.e., a biosensor, can be formed.

However, when the thin gold film is patterned using wet-etching, the photoresist pattern is likely to peel off when being etched due to the poor adhesion between the photoresist pattern and the gold film, and the peeled-off photoresist contaminates an etching chamber. Moreover, since the wet-etching is an isotropic etching, it is not suitable for forming fine patterns.

On the other hand, when the thin gold film is patterned using dry-etching, there is a problem in that throughput of the patterning process is low, and the photoresist is redeposited on the surface of the substrate during the etching process.

Moreover, since the method according to the related art requires a number of manufacturing processes, it is difficult to improve the production yield.

SUMMARY OF THE INVENTION

Accordingly, the present invention has been made keeping in mind the above problems occurring in the related art, and is intended to provide an apparatus and method for correcting the position of a laser beam, thereby realizing a biosensor with a fine and precise pattern with laser.

The present invention is further interned to provide an apparatus and method for correcting the position of a laser beam to be used in the manufacturing of a biosensor with a fine pattern, in which the apparatus and method compensates for a distortion attributable to an operation error of an X-Y scanning mirror or an error of a plane lens before forming a circuit pattern of the biosensor.

The present invention is still further intended to provide an apparatus and method for correcting a position of a laser beam to be used in the manufacture of a biosensor with a fine pattern, in which the apparatus and method enables a circular spot of the laser beam to be positioned at the center of one cell of a substrate so that it is possible to form a fine pattern for a biosensor using a precise and accurate coordinate system.

The objects of the present invention are not limited to the above.

In order to achieve the above object, according to one aspect of the present invention, there is provided an apparatus for correcting a position of a laser beam for use in the manufacture of a biosensor having a fine pattern, the apparatus including: a loading unit with a surface on which an alignment mark is formed and on which a substrate is loaded; a laser beam generating unit that is positioned above the loading unit and generates a laser beam in a direction toward the surface of the loading unit to form an alignment mark and a fine pattern on a substrate; a vision unit that generates corrected coordinate values based on the formed alignment mark and on a driving error of the laser beam generating unit; a position detector that is positioned at a lower end portion of a center portion of the loading unit and that detects information of the laser beam generated by the laser beam generating unit; and a controller that controls the laser beam generating unit in accordance with the corrected coordinate values generated by the vision unit, and controls power of the laser beam from the laser beam generating unit on the basis of the information detected by the position detector or controls a position of the loading unit.

A circuit pattern for the biosensor may be formed on the substrate.

The information about the laser beam may include at least one of a position, a size, and power of the laser beam.

When the information about the laser beam detected by the position detector indicates that the size of the laser beam is different from a preset value, the laser beam generating unit is moved in a direction of the Z-axis so that the focus of the laser beam may be adjusted.

When the information about the laser beam detected by the position detector indicates that the position of the laser beam has deviated from an origin of a local coordinate system, the loading unit is moved in the X-axis direction and the Y-axis direction so that the position of the laser beam in each section may be defined as the origin (0, 0).

The laser beam generating unit may include a laser beam generating portion that generates the laser beam, an aperture portion that divides the laser beam generated by the laser beam generating portion into finer beams having a predetermined size, a laser expander that expands the finer beam produced by the aperture portion in a predetermined magnification, and an X-Y scanning mirror that adjusts a position of the expanded laser beam produced by the laser expander and transfers the position-adjusted laser beam to a plane lens.

The apparatus may further include a UVW stage that is located at a lower end portion of the loading unit and moves the loading unit. The apparatus can correct the position of the laser beam by calculating the coordinate values using values of an encoder by which the UVW stage moves.

In order to achieve the above object, according to another aspect, there is provided a method of correcting a position of a laser beam used to adjust a line width of a circuit pattern for a biosensor, the method including: a first step of matching the position of the center of a substrate with an origin defined using an alignment mark which is formed on a loading unit by a vision unit, and inspecting an alignment mark on the substrate which is formed based on the coordinate of the origin; a second step of correcting the position of a laser beam generating unit after obtaining a corrected coordinate system based on the inspection of the alignment mark on the substrate; a third step of transferring a laser beam irradiated from the laser beam generating unit, the position of which was corrected; a fourth step of comparing information about the laser beam received by a position detector with information formed by the position detector; and a fifth step of using a controller to move the loading unit in accordance with the information about the laser beam received by the position detector so that the position becomes the origin (0, 0).

Specifically, the position detector may acquire information about the size and power of the laser beam on the basis of the laser beam received by the position detector.

When a preset size of the laser beam and the size of the laser beam received by the position detector are different, the fifth step may include a step of using the controller to move the laser beam generating unit in a direction of Z-axis to adjust the focus of the laser beam.

The fifth step may further include a step of controlling the laser beam generating unit by using the controller such that the intensity of the laser beam is adjusted in accordance with preset power of the laser beam set by the position detector.

As described above, the present invention can achieve mass production of a biosensor and high precision through repetitive processes when forming a circuit having a precise sensor portion.

The present invention can perform corrections that reduce the errors of an X-Y scanning mirror or a plane lens, thereby obtaining a fine pattern and increasing the pattern density.

In addition, the present invention can produce biosensors with no variation in performance and with high precision, even by using repetitive processes by compensating for an error (by using an alignment imaging apparatus) generated when moving a stage which must be moved repetitively and precisely when loading a substrate.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
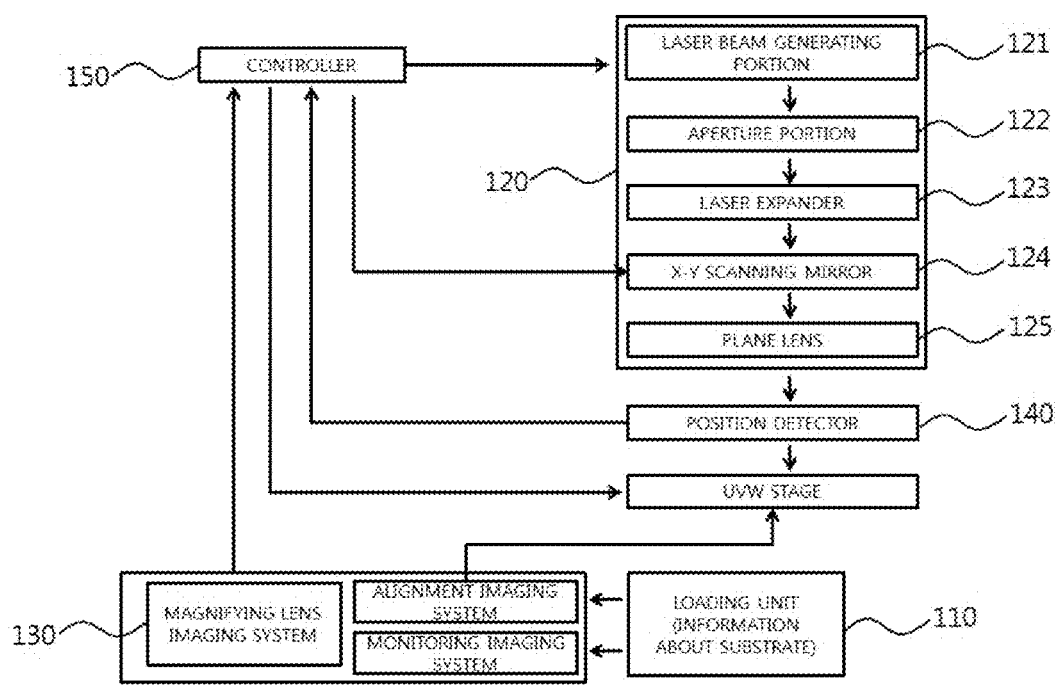
FIG. 1 is a schematic view illustrating an apparatus for correcting a position of a laser beam for use in the manufacturing of a biosensor having a fine pattern according to an embodiment of the present invention.

Hereinbelow, an optical sensor strip according to an embodiment of the invention, and a diagnostic apparatus equipped with the optical sensor strip will be described with reference to the accompanying drawings.

Hereinafter, a preferred embodiment of the present invention will be described in detail with reference to the accompanying drawings. Wherever possible, the same reference numerals will be used throughout the drawings and the description to denote the same components. In describing the present invention, if it was concluded that the detailed description on the related art or construction would make the gist of the present invention ambiguous, the detailed description will not be provided.

Figure 2:
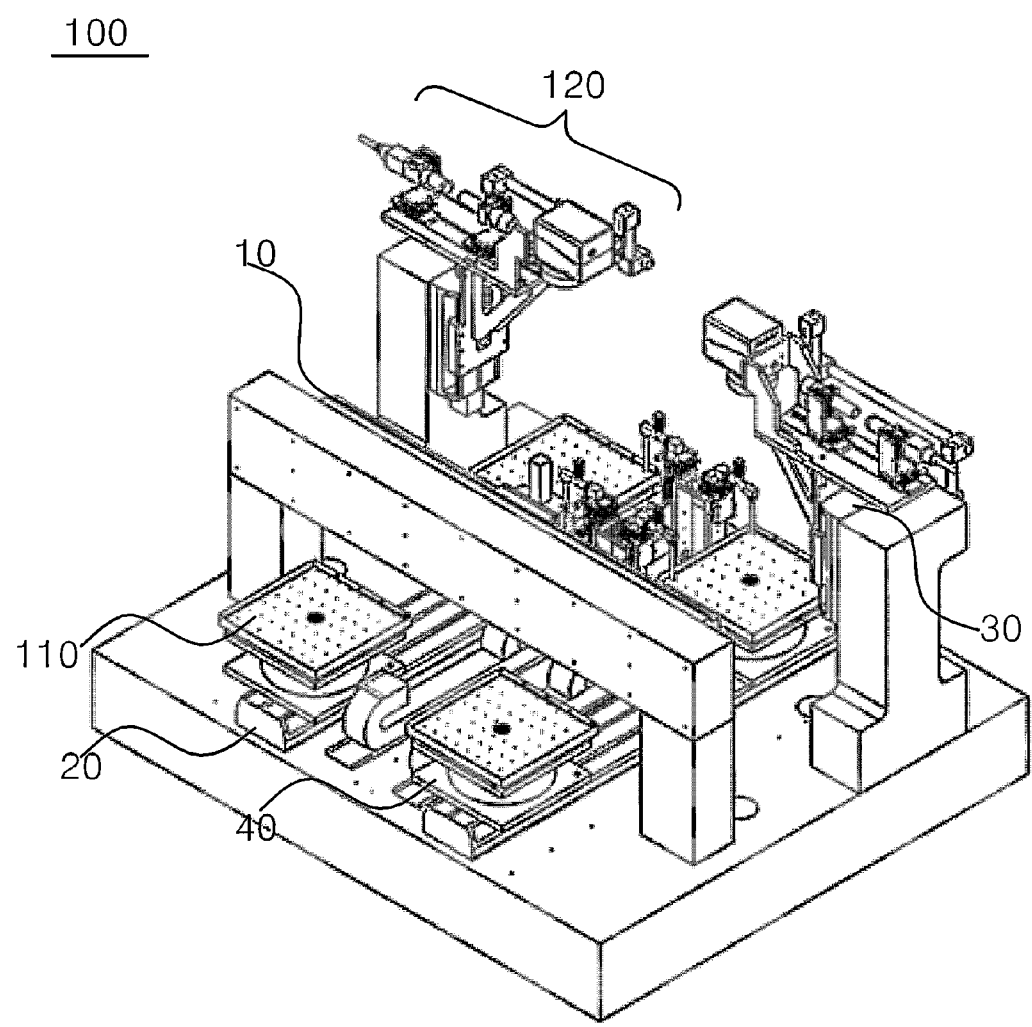
FIG. 2 is a diagram illustrating the apparatus for correcting a position of a laser beam for use in the manufacture of a biosensor having a fine pattern according to an embodiment of the present invention.

FIGS. 1 and 2 are drawings illustrating a laser position correcting device configured to control a width of a fine line of a biosensor according to an embodiment of the present invention. The laser position correcting device 100 includes a loading unit 110, a laser beam generating unit 120, a vision unit 130, a position detector 140, and a controller 150.

The loading unit 110 has an alignment mark on the surface and a substrate is loaded on the loading unit 110. At this point, a plurality of suction holes are formed in the loading unit 110 to fix the substrate by suction.

In addition, the loading unit 110 is installed on a Y-axis stage 20 so that it can easily move in a direction of the Y-axis. The loading unit 110 is installed on a UVW stage 40 so that it can easily move in directions of the X-Y-θ axes on the UVW stage 40. Here, it is desirable that the loading unit 110 is fixed on the UVW stage 40 and moves in the directions of the X-Y-θ axes. At this point, the loading unit 110 calculates coordinates on the basis of values of an encoder (not illustrated) by which the UVW stage 40 is moved when correcting the position.

The laser beam generating unit 120 is positioned above the loading unit 110 and generates a laser beam in a direction toward to the loading unit 110. The loading unit 110 moves in a direction of the Y-axis to reach the laser beam generating unit 120 and is positioned there. At this point, the laser beam generating unit 120 forms an alignment mark or a fine pattern on the substrate.

Here, it is preferable that the line width of the fine pattern be 100 μm or more narrow.

In addition, the laser beam generating unit 120 is installed on a Z-axis stage 30 to control the line width of the laser beam, so that the laser beam generating unit 120 can move only in the vertical direction.

Figure 3:
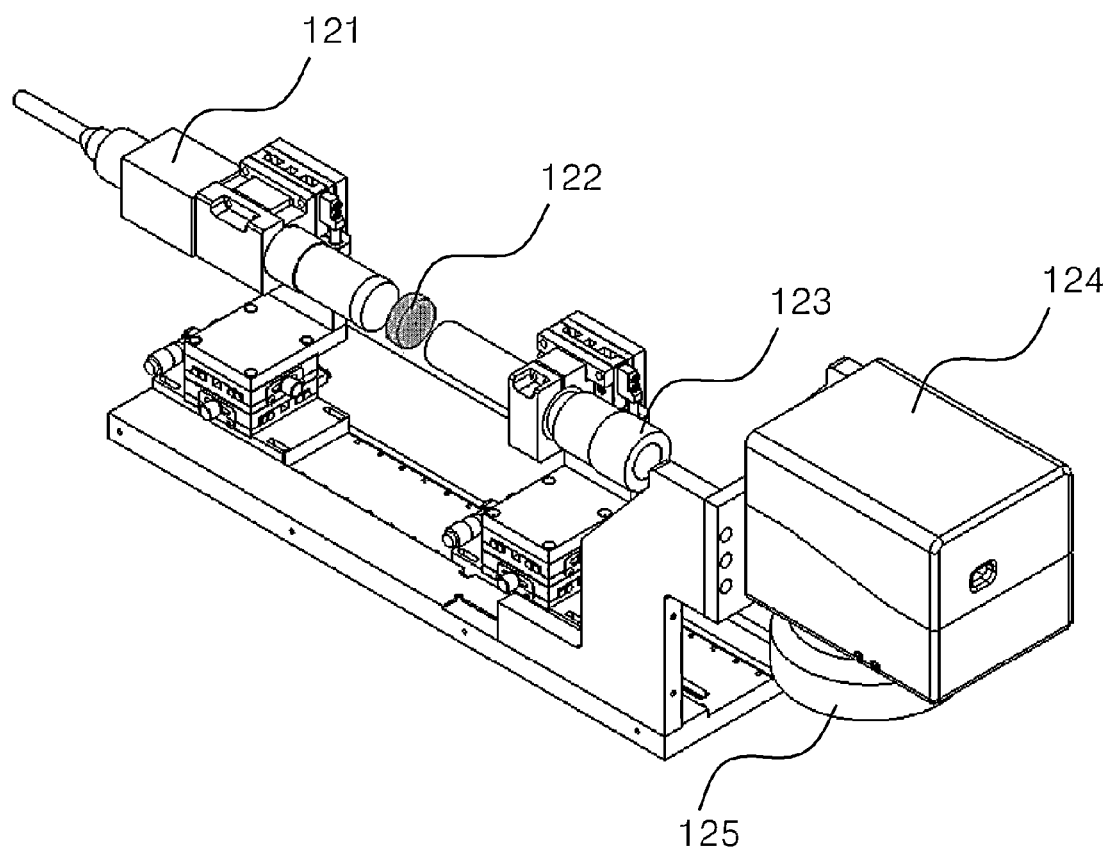
FIG. 3 is a diagram illustrating the apparatus for correcting a position of a laser beam for use in the manufacture of a biosensor having a fine pattern according to an embodiment of the present invention.

As illustrated in FIG. 3, the laser beam generating unit 120 includes a laser beam generating portion 121, an aperture portion 122, a laser expander 123, and an X-Y scanning mirror 124.

Here, the laser generating portion 121 generates a primary laser beam.

Here, the aperture portion 122 cuts the primary laser beam generated by the laser beam generating portion 121 into a beam having a predetermined size.

Here, the laser expander 123 expands the laser beam cut by the aperture portion 122 in a predetermined magnification. At this point, the laser expander 123 controls the size of the line width.

Here, the X-Y scanning mirror 124 controls the position of the laser beam expanded by the laser expander 123, transfers the laser beam to a plane lens (F-theta) 125, and lets the laser beam be irradiated outside.

The vision unit 130 causes the laser beam generating unit to irradiate the laser beam onto the substrate loaded on the loading unit 110 and generates corrected coordinate values based on the alignment mark on the loading unit 110. At this time, when the loading unit 110 moves in the direction of the Y-axis, the vision unit 130 moves in the direction of the X-axis so as to recognize the alignment mark of the loading unit 110. The vision unit 130 is installed on an X-axis stage 10 so as to be applied to a plurality of the loading units 110.

Figure 4:
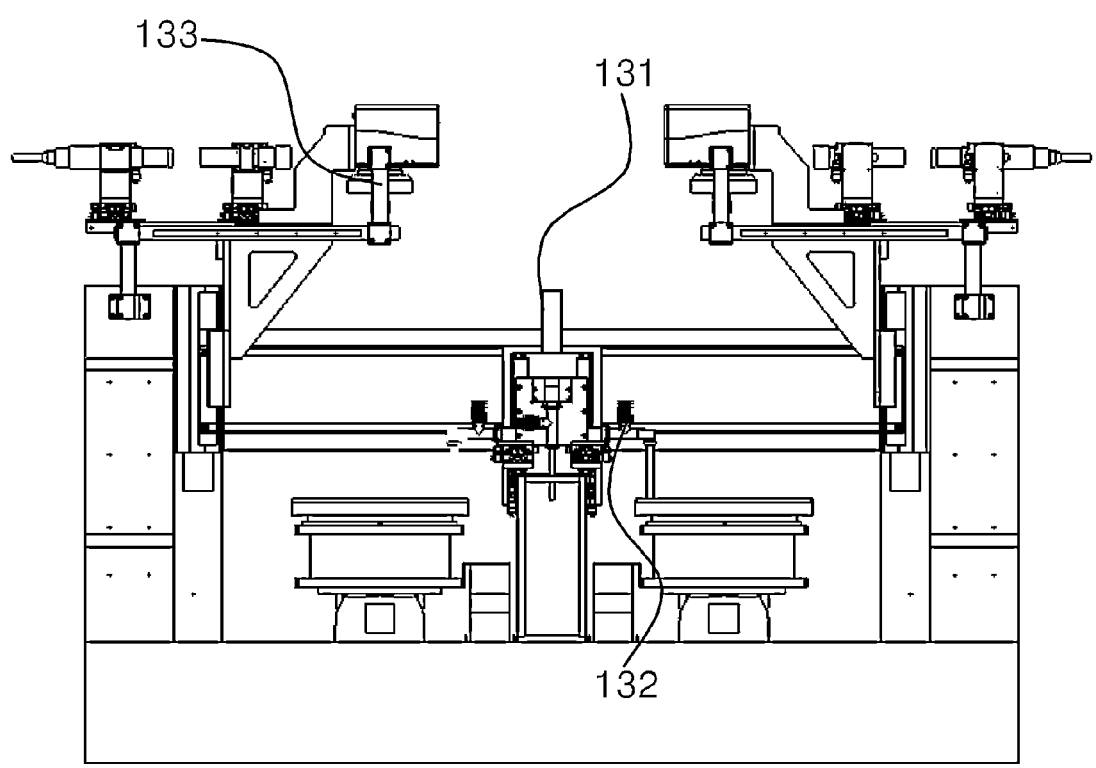
FIG. 4 is a front view illustrating the apparatus for correcting a position of a laser beam for use in the manufacture of a biosensor having a fine pattern according to an embodiment of the present invention.

Here, the vision unit 130 includes a magnifying lens imaging device 131, an alignment imaging device 132, and a monitoring imaging device 133 in the arrangement as illustrated in FIG. 4.

The magnifying lens imaging device 131 defines an origin by detecting the alignment mark of the loading unit 110 and corrects the coordinates of the X-Y scanning mirror 124 by detecting the alignment mark on the substrate processed by the laser beam generated by the laser beam generating unit 120.

In greater detail, the coordinates are obtained by receiving the image of the upper portion of the loading unit and comparing the image with the alignment mark of the substrate loaded on the loading unit.

The alignment imaging device 132 receives the alignment mark of the loaded substrate in real time and positions the substrate at the origin defined by the alignment imaging device.

The monitoring imaging device 133 transmits the image of the processed area to a monitor so that an operator can check the status of the process at the process area of the laser beam, and enables the operator to monitor the laser beam without directly looking at the laser beam.

The position detector 140 is positioned at the center of the lower portion the loading unit 110, receives the laser beam generated by the laser beam generating unit 120, and detects the information about the laser beam.

Figure 5:
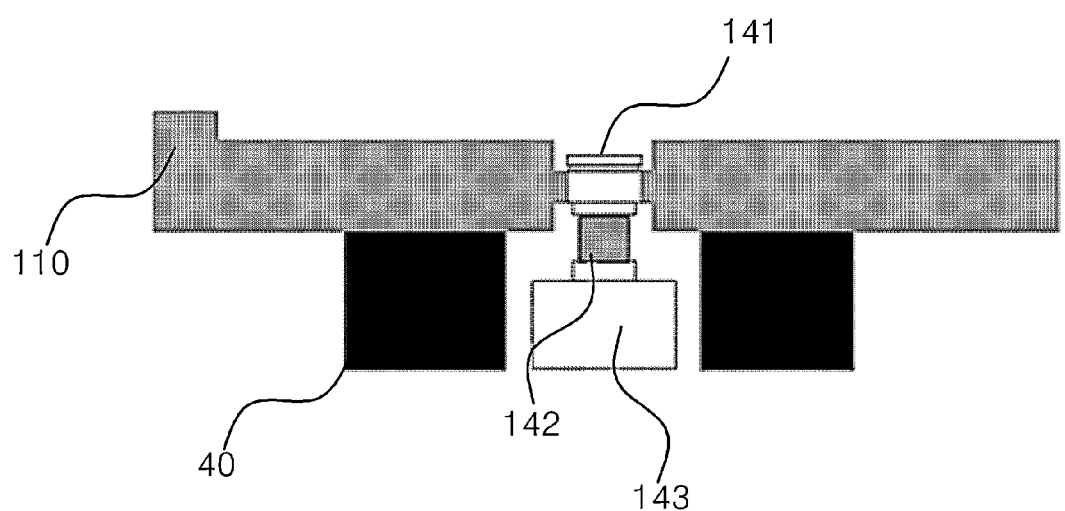
FIG. 5 is a drawing illustrating a position detector of the apparatus for correcting a position of a laser beam for use in the manufacture of a biosensor having a fine pattern according to an embodiment of the present invention.

As illustrated in FIG. 5, the position detector 140 includes a lens 141, a filter 142, and a CCD camera 143 so as to obtain the information about the irradiated laser beam. The laser beam received in the lens 141 is filtered by the filter 142 and the information about the laser beam is obtained by the CCD camera 143.

At this time, the information about the laser beam includes at least one of a position, a size, and power of the laser beam.

The controller 150 controls the X-Y scanning mirror 124 of the laser beam generating unit 120 depending on the corrected coordinates generated by the vision unit 130. The controller 150 then controls the intensity of the laser beam to be irradiated from the laser beam generating unit 120 depending on the information detected by the detector 140 or controls the position of the loading unit 110.

Figure 6A:
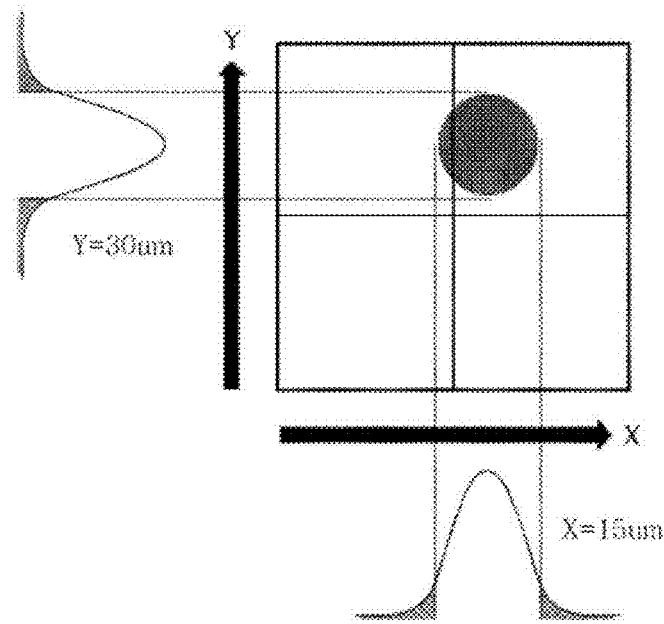
FIGS. 6A and 6B are drawings illustrating a laser beam detected by the position detector of the apparatus for correcting a position of a laser beam for use in the manufacture of a biosensor having a fine pattern and redefined coordinates according to an embodiment of the present invention.
Figure 6B:
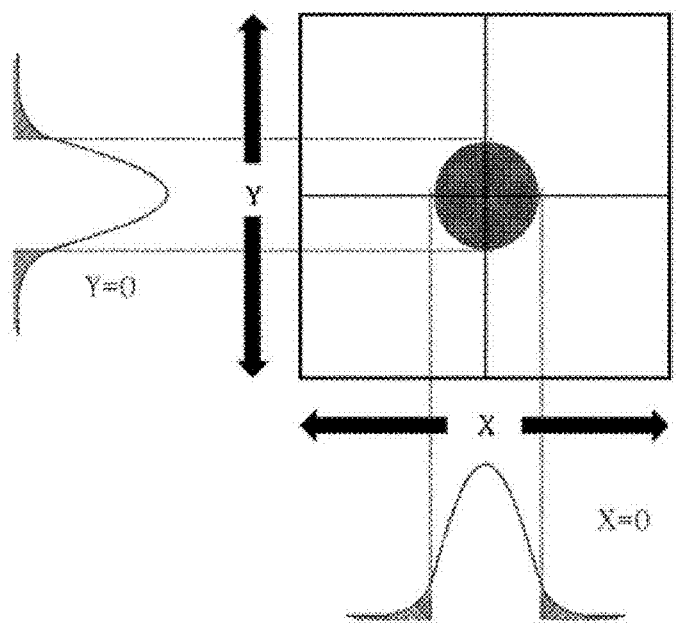

When the reception position of the laser beam detected by the detector 140 deviates from the origin (0, 0) by a certain amount as illustrated in FIG. 6A; the controller 150 moves the loading unit 110 by a distance corresponding to the deviation as illustrated in FIG. 6B, redefines the position where the laser beam is received as the origin (0, 0), and resets the coordinate system by reflecting the change (the distance the loading unit 110 has moved by) in the coordinate values.

When the position of the laser beam among the information detected by the position detector 140 deviates from the origin of the local coordinate system by a certain amount, the controller 150 moves the loading unit 110 in the directions of the X- and Y-axes to redefine the position of the laser beam at each section as an origin (0, 0). The position of each cell in the substrate, which is made up of cells, is corrected.

When the information about the laser beam detected by the position detector 140 indicates that the size of the laser beam is different from the desired value, the controller 150 moves the laser beam generating unit 120 in a direction of the Z-axis so that the focus of the laser beam may be adjusted.

Figure 7:
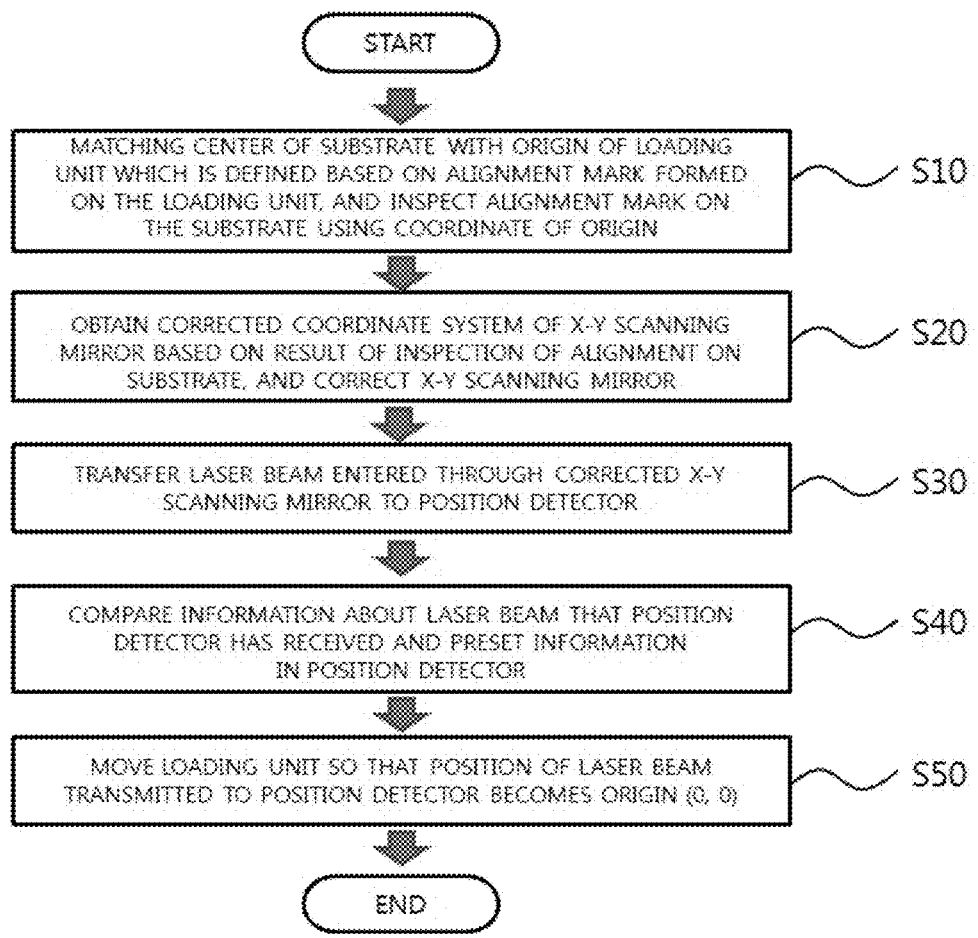
FIG. 7 is a flowchart illustrating a method of correcting a position of a laser beam for use in the manufacture of a biosensor having a fine pattern according to another embodiment of the present invention.

The method illustrated in FIG. 7 for correcting a position of a laser beam to adjust a line width of a circuit pattern for a biosensor according to an embodiment of the present invention is described as follows. The embodiment of the present invention will be described with respect to the correction of the position based on one of the cells in the substrate in which a cell is a basic unit, but the technique can be applied to the entire substrate.

An inspection is performed as follows (S10): the vision unit 130 causes the laser beam generated by the laser beam generating unit 120 to form the alignment mark on the substrate such that an origin of the loaded substrate matches an origin defined based on the alignment mark which is formed on the loading unit 110; and the alignment mark of the substrate is compared with the coordinates of the origin (Step S10).

Figure 8:
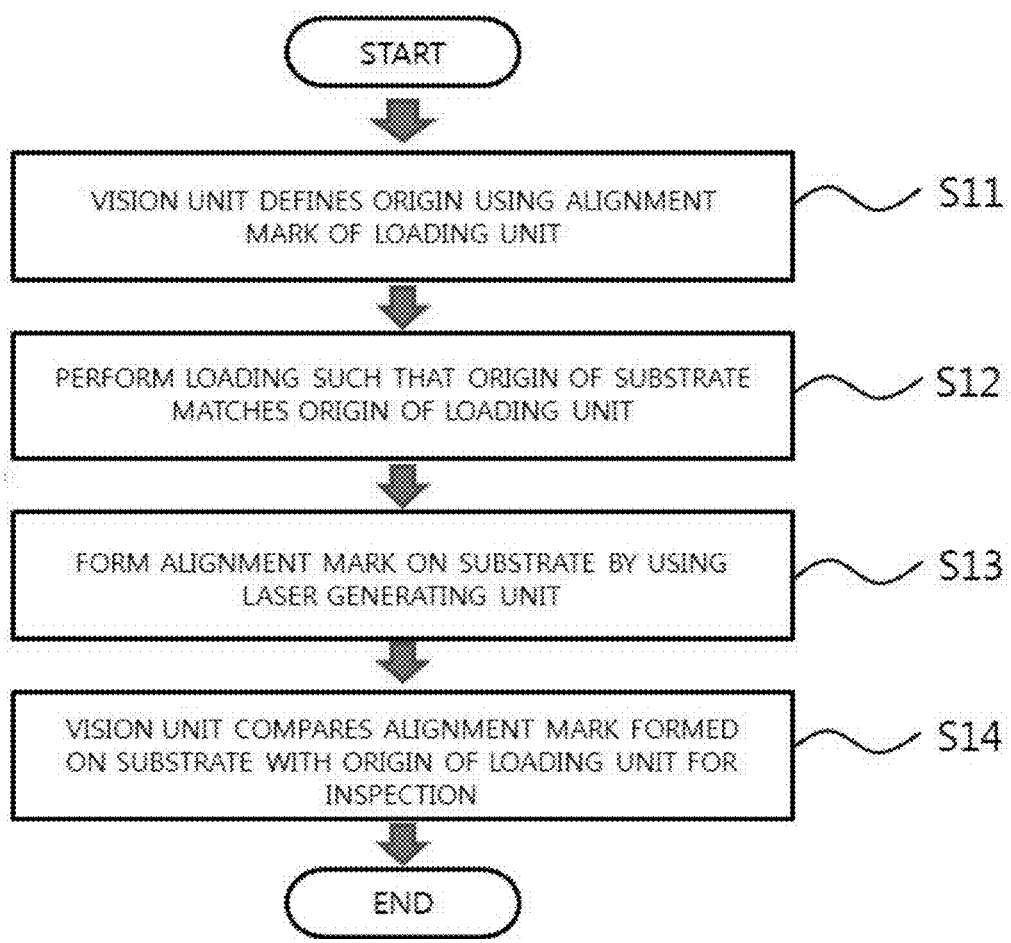
FIG. 8 is a flowchart illustrating a method of comparing alignment marks generated by the method for correcting a position of a laser beam for use in the manufacture of a biosensor having a fine pattern according to the another embodiment of the present invention.

Step S10 will be described in greater detail with reference to FIG. 8. The vision unit 130 defines the origin using the alignment mark of the loading unit 110 (Step S11). The origin of the substrate loaded on the loading unit 110 is matched with the alignment imaging device (Step S12). The laser beam generating unit 120 forms an alignment mark on the substrate (Step S13). It is desirable that the alignment mark on the substrate is formed on the basis of the origin of the alignment mark of the loading unit 110.

The vision unit 130 inspects the alignment mark on the substrate by comparing the formed alignment mark on the substrate with the coordinates of the origin (Step S14).

A corrected coordinate system of the X-Y scanning mirror 124 of the laser beam generating unit 120 can be obtained based on the deviation between the formed alignment mark on the substrate and the defined coordinate of the origin of the loading unit 110 by conducting an inspection using the magnifying lens imaging device 131 of the vision unit 130, and thus the position of the X-Y scanning mirror 124 is corrected based on the corrected coordinate system (Step S20). At this time, the reason that an error occurs even though the alignment mark has been formed on the substrate after the original of the alignment mark of the loading unit 110 and the origin of the substrate are adjusted to match with each other is that the distortion may increase as the distance from the origin increases due to the operation error of the X-Y scanning mirror 124.

When the magnifying lens imaging device 131 inspects the formed alignment mark of the substrate, a recognition error may occur depending on the conditions under which the alignment mark is formed.

The laser beam irradiated via the X-Y scanning mirror 124 of the corrected laser beam generating unit 130 is transferred to the position detector 140 (Step S30).

The information about the laser beam received by the position detector 140 is compared with the preset information set in the position detector in advance (Step S40). The position of the laser beam that is actually irradiated to the center portion of the substrate means the position transferred via the X-Y scanning mirror 124 that was corrected using the defined coordinates.

Figure 9:
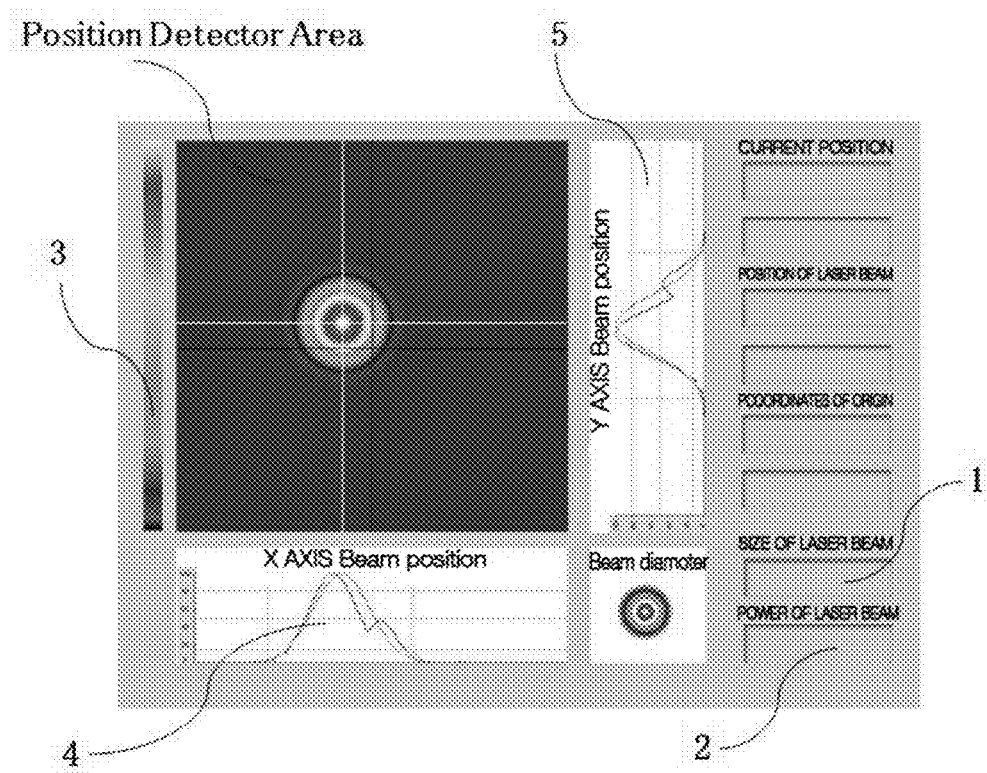
FIG. 9 is a diagram illustrating information about the laser beam received by the position detector by the method for correcting a position of a laser beam for use in the manufacture of a biosensor having a fine pattern according to the another embodiment of the present invention.

The position detector 140 may obtain various kinds of information about the transferred laser beam as illustrated in FIG. 9.

Examples of the obtained information received by the detector 140 include the size 1 of the laser beam, power 2 of the laser beam, temperature 3 of the laser beam, the X-coordinate 4 of the laser beam, and the Y-coordinate 5 of the laser beam.

The controller 150 moves the loading unit 110 until the position of the laser beam received by the position detector 140 becomes the origin (0, 0) (Step S50). At this point, the position detector 140 can obtain the moved coordinate values on the basis of coordinate values of the current position of the UVW stage 40 on which the loading unit 110 is loaded and on the basis of the coordinates to which the UVW stage 40 is moved in order to make the position of the laser beam received by the position detector 140 be the origin.

The position of the laser beam can be obtained by detecting the central point of the laser beam where the thermal energy is the highest.

The loading unit 110 is installed on the Y-axis stage 20 so that it can move only in the direction of the Y-axis. However, the origin of the loading unit 110 can be adjusted by moving the UVW stage 40 installed at the lower end portion of the loading unit 110.

When the preset size of the laser beam set in the position detector 140 is different from the size of the laser beam received by the position detector 140, the controller 150 moves the laser beam generating unit 120 in the direction of the Z-axis to adjust the focus of the laser beam.

In Step S50, the controller 150 controls the laser beam generating unit 120 such that the intensity of the laser beam is adjusted in accordance with the preset power of the laser beam set in the position detector 140.

In the present invention, a fine pattern can be obtained by correcting an error generated when moving the stage which is required to move repetitively and precisely and loading the substrate, and by performing correction to reduce errors of the X-Y scanning mirror and the plane lens. In addition, it is possible to produce biosensors the performance of which does not vary even through repetitive processes are performed during the production of the biosensors by using the information about the actually irradiated laser beam and precisely performing a correction process.

The apparatus and method for correcting the position of a laser beam for use in the manufacture of a biosensor having a fine pattern is not limited to the configurations and the operations of the embodiment as described above. The various embodiments described herein can be selectively or entirely combined to provide further embodiments. Various modifications and additions can be made to the exemplary embodiments discussed herein, without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for correcting a position of a laser beam to be used when manufacturing a biosensor having a fine pattern, the apparatus comprising:
    a loading unit with a surface on which an alignment mark is formed and on which a substrate is loaded;
    a laser beam generating unit that is positioned above the loading unit and generates a laser beam in a direction toward the surface of the loading unit to form an alignment mark and a fine pattern on the substrate;
    a vision unit that generates corrected coordinate values based on the alignment mark formed on the substrate, and a driving error of the laser beam generating unit;
    a position detector that is positioned at a lower end portion of a center portion of the loading unit and that detects information about the laser beam generated by the laser beam generating unit; and
    a controller that controls the laser beam generating unit according to the corrected coordinate values generated by the vision unit, and controls a power of the laser beam of the laser beam generating unit on the basis of the information detected by the position detector or controls a position of the loading unit.

2. The apparatus according to claim 1, wherein the substrate has a circuit pattern for the biosensor.

3. The apparatus according to claim 1, further comprising at least one of a position, a size, and the power of the laser beam.

4. The apparatus according to claim 3, wherein the laser beam generating unit is moved in a direction of the Z-axis so that a focus of the laser beam may be adjusted when the information about the laser beam detected by the position detector indicates that the size of the laser beam is different from a preset value.

5. The apparatus according to claim 3, wherein the loading unit is moved in a direction of the X-axis and a direction of the Y-axis so that the position of the laser beam may be defined as an origin (0, 0) for each section when the information about the laser beam detected by the position detector indicates that the position of the laser beam has deviated from an origin of a local coordinate system.

6. The apparatus according to claim 1, further comprising:
    a laser beam generating portion that generates the laser beam;
    an aperture portion that cuts the laser beam generated by the laser beam generating portion into a sub-beam having a predetermined size;
    a laser expander that expands the sub-beam produced by the aperture portion to a predetermined magnification; and
    an X-Y scanning mirror that adjusts a position of the expanded laser beam produced by the laser expander and transfers the position-adjusted laser beam to a plane lens.

7. The apparatus according to claim 1, further comprising:
    a UVW stage that is located at a lower end portion of the loading unit so that the loading unit can be moved, wherein the apparatus is capable of correcting the position of the laser beam by calculating coordinate values using values of an encoder by which the UVW stage is moved.

8. A method of correcting a position of a laser beam to adjust a line width of a circuit pattern for a biosensor, the method comprising:
- a first step of matching a position of the center of a substrate with an origin defined using an alignment mark which is formed on a loading unit by a vision unit, and inspecting an alignment formed mark on the substrate which is formed according to a coordinate of the origin;
- a second step of adjusting a position of a laser beam generating unit after obtaining a corrected coordinate system by inspecting the alignment mark on the substrate;
- a third step of transferring the laser beam irradiated from the laser beam generating unit whose position was adjusted;
- a fourth step of comparing information about the laser beam received by a position detector with information which is present in the position detector; and
- a fifth step of moving the loading unit by using a controller such that a position in the information becomes an origin (0, 0) in accordance with the information about the laser beam received by the position detector.

9. The method according to claim 8, wherein the position detector further obtains information about at least one of a position, a size, and power of the laser beam from the laser beam transmitted thereto.

10. The method according to claim 8, wherein the fifth step includes a step of moving the laser beam generating unit in a direction of the Z-axis to adjust focusing of the laser beam when the information about the laser beam detected by the position detector indicates that the size of the laser beam is different from a preset value.

11. The method according to claim 8, wherein the fifth step further includes a step of controlling the laser beam generating unit by using the controller such that intensity of the laser beam is adjusted in accordance with a preset power of the laser beam set in the position detector.

* * * * *